United States Patent [19]

Kohama et al.

[11] Patent Number: 4,513,628
[45] Date of Patent: Apr. 30, 1985

[54] TORQUE DETECTOR

[75] Inventors: Tokio Kohama, Nishio; Hideki Obayashi, Okazaki; Toshikazu Ina, Nukata; Seiichi Narita, Chiryu, all of Japan

[73] Assignees: Nippon Soken, Inc., Nishio; Nippondenso Co., Inc., Kariya, both of Japan

[21] Appl. No.: 501,762

[22] Filed: Jun. 6, 1983

[30] Foreign Application Priority Data

Jun. 8, 1982 [JP] Japan ................................ 57-99033

[51] Int. Cl.³ .............................................. G01L 3/14
[52] U.S. Cl. .............................................. 73/862.34
[58] Field of Search ................................... 73/862.34

[56] References Cited

U.S. PATENT DOCUMENTS 4,186,597  2/1980  Brown ............................. 73/862.34

FOREIGN PATENT DOCUMENTS

0909597  2/1982  U.S.S.R. ........................... 73/862.34

Primary Examiner—Charles A. Ruehl
Attorney, Agent, or Firm—Cushman, Darby & Cushman

[57] ABSTRACT

A torque detector, for detecting a torque applied to a torque transmission shaft which is connected to a load such as a wheel of an automobile, comprises a first rotating member which is integrally connected to a driving shaft of an engine, a second rotating member which is integrally connected to a load so as to be opposed to the first rotating member, a plurality of elastic members for connecting the opposed surfaces of the first and second rotating members, an angular phase difference detecting circuit for detecting the angular phase difference between the first and second rotating members, a no load condition detecting circuit for detecting a no load condition of the engine, and a data processor for calculating torque from the angular phase difference between the first and second rotating members under the load condition and under the no load condition. An accurate value of applied torque is detected by subtracting the angular phase difference under the no load condition from the load condition.

6 Claims, 15 Drawing Figures

SMALL ←— TORQUE —→ LARGE

TORQUE DETECTOR

BACKGROUND OF THE INVENTION

The present invention relates to a torque detector, particularly to a torque detector for detecting a torque applied to a torque transmission shaft which is connected to a load such as a wheel of an automobile.

The conventional torque detector of this type is provided with a detector shaft of which one end is connected to a driving shaft of an engine and the other end is connected to the torque transmission shaft. In this torque detector, the torque applied to the torque transmission shaft is detected by detecting the distortion occurring in the above detector shaft.

The distortion of the above shaft is detected by a detecting means of a strain gauge type comprising a strain gauge of which electric resistance varies in proportion to the distortion, of a magnetic strain type comprising a magnetic strain pipe of which magnetic property varies in accordance with the distortion, or of a phase difference type which detects a phase difference between the distortion occurring at two separated points of the detector shaft.

However, the conventional torque detector having the above structure has been mainly employed in the performance test of an engine because the weight of the detector is large and the structure thereof is complex. Therefore, the conventional torque detector cannot be mounted on the automobile practically.

Accordingly, one object of the present invention is to provide a torque detector which is small in size and simple enough in structure to be mounted on an automobile and by which excellent detection accuracy can be obtained.

Another object of the present invention is to provide a torque detector by which accurate torque can be detected in spite of errors in the setting position at which the detector is mounted on the automobile or the like.

SUMMARY OF THE INVENTION

The torque detector of the present invention comprises a first rotating member which is adapted for connection to a driving shaft of an engine, a second rotating member which is adapted for connection to a load so as to be opposed to the first rotating member, a plurality of elastic members for connecting the opposed surfaces of the first and second rotating members, an angular phase difference detecting means for detecting the angular phase difference between the first and second rotating members, a no load condition detecting a means for detecting no load condition of the engine, and a data processing means for calculating torque from the angular phase difference between the first and second rotating members under a load condition and that under a no load condition.

In the torque detector according to the present invention, the elastic members deform in response to the applied torque and angular phase difference occurs between the first rotating member and the second rotating member. Then, the applied torque is detected from the above angular phase difference.

The important point of the present invention is that an accurate value of applied torque is detected by subtracting the angular phase difference under a no load condition from that under a load condition. Namely, when the torque detector is mounted on an automobile or the like, errors in the setting position of the rotating members, the phase difference detecting means and the like, appear. As a result, when the engine is under a no load condition, apparent torque is generated. According to the present invention, this apparent torque is compensated for and accurate torque can thus be detected.

DETAILED DESCRIPTION OF EMBODIMENTS

Hereinafter, the present invention will be explained in detail in accordance with the embodiments thereof with reference to the accompanying drawings.

Figure 1:
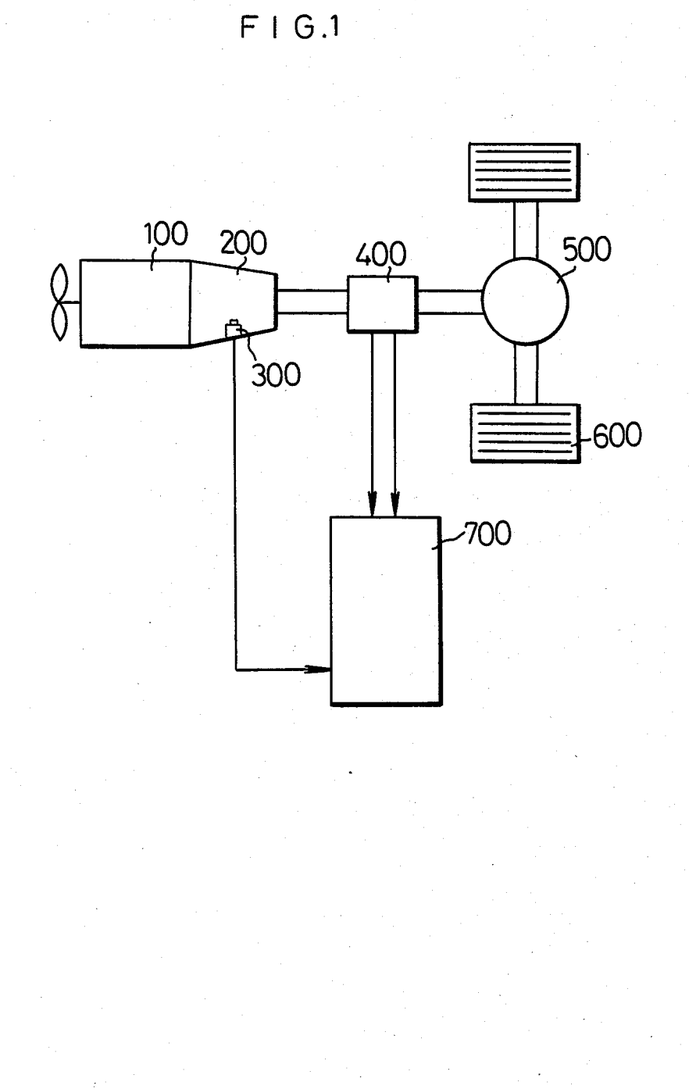
FIG. 1 is a schematic view of a drive system for an automobile, provided with a torque detector according to the present invention.

FIG. 1 is a schematic view of a drive system for an automobile, provided with a torque detector according to the present invention.

In FIG. 1, the reference numeral 100 designates an internal combustion engine of an automobile, 200 designates a transmission connected to the output shaft of the engine 100, 400 designates a torque detector, 500 designates a final gear, 600 designates driving wheels, and 700 designates a data processing means.

Figure 2:
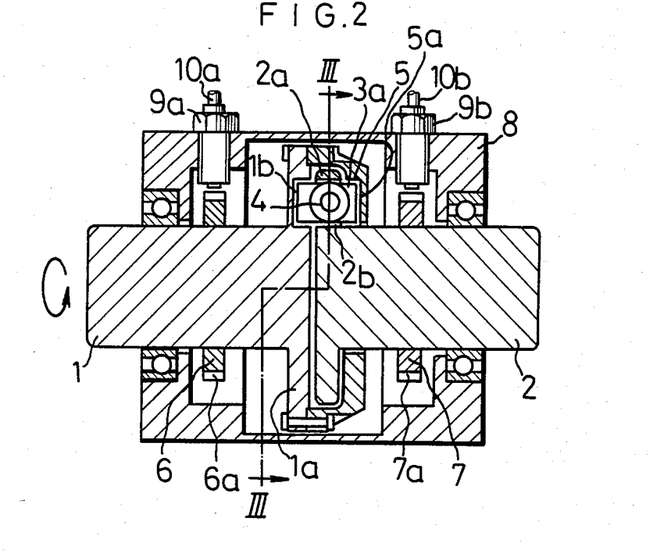
FIG. 2 is a longitudinal sectional view of one embodiment of a torque detector according to the present invention taken along the line II—II of FIG. 3.
Figure 3:
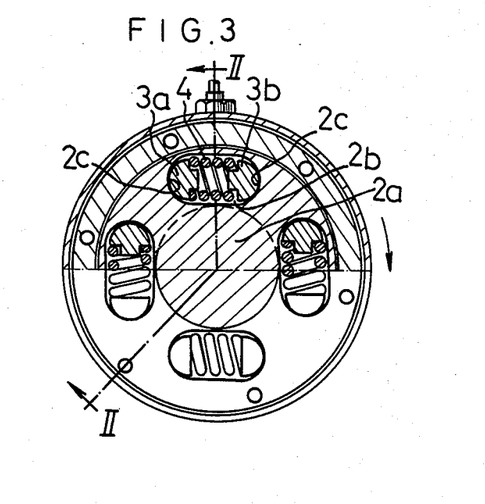
FIG. 3 is a transverse sectional view taken along the line III—III of FIG. 2.
Figure 4:
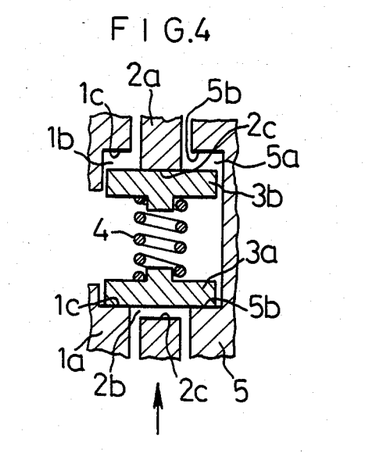
FIG. 4 is a longitudinal sectional view of an elastic member shown in FIG. 3.

FIGS. 2 to 4 illustrate a first embodiment of the torque detector according to the present invention.

Shafts 1, 2 are coaxially arranged within a casing 8 so as to be opposed to each other and they are rotatably supported thereby.

The shaft 1 is driven by the engine 100 while one end of the shaft 2 is connected to a load outside of the casing 8.

A thick walled flange 2a is formed in the other end of the shaft 2 so as to be opposed to the other end of the shaft 1.

In the flange 2a, four long holes 2b extending in the circumferential direction are formed at equal angular distances.

Spring receiving members 3a, 3b having a semicircular cross section and an axial length larger than the thickness of the flange 2a, are closely inserted into both ends of each of the long holes 2b so as to project on both sides of the flange 2a.

A coil spring 4 is arranged within each of the long holes 2b and both ends thereof are supported by a flat surface of each of the spring receiving members 3a, 3b. The curved surface of each of the receiving members 3a, 3b slidably contacts with the wall defining each of the end portions of the long hole 2b.

In the other end of the shaft 1, a flange 1a is formed so as to be opposed to the flange 2a of the shaft 2. And grooves 1b are formed in the flange 1a so as to be opposed to the long holes 2b formed in the flange 2a.

A coupling flange 5 is fixed to the outer periphery of the flange 1a by means of rivets so as to cover the flange 2a.

In the coupling flange 5, grooves 5a are formed so as to be opposed to the gooves 1b of the flange 1a through the long holes 2b.

Both end portions of each of the receiving members 3a, 3b, which project on both sides of the flange 2a, are inserted into the grooves 5a, 1b.

To the outer periphery of the shafts 1, 2, annular plates 6, 7 are fixed, respectively. In the outer peripheral surface of each of the annular plates 6, 7, a plurality of teeth 6a, 7a are formed at equal angular distances.

Electromagnetic pickups 9a, 9b are provided in the casing 8 so as to be opposed to the teeth 6a, 7a, respectively. The pickups 9a, 9b detect the passing of the teeth 6a, 7a and generate electrical signals. The generated electrical signals are supplied to a pulse phase difference detecting circuit, described later, by way of lead wires 10a, 10b.

Furthermore, a detecting means 300 for detecting the neutral position of the transmission 200 is mounted on the transmission 200 as shown in FIG. 1. In this embodiment, a switch is employed as the detecting means 300.

In operation, when the shaft 1 is rotated in the direction of the arrow in FIGS. 1 to 3, the coupling flange 5 also rotates with the shaft 1.

One end surface 1c of each of the grooves 1b formed in the flange 1a of the shaft 1 and one end surface 5b of each of the grooves 5a formed in the coupling flange 5 push the receiving members 3a as shown in FIG. 4. This pushing force is transmitted to the receiving members 3b through the coil springs 4. The receiving members 3b push the flange 2a of the shaft 2 to rotate the shaft 2 in the same direction as the rotating direction of the shaft 1.

When the load of the shaft 2 is small, the deforming amount of each spring 4 is small and as the load of the shaft 2 increases, the deforming amount of each spring 4 increases in proportion thereto.

Due to this deformation of the coil springs 4, a phase difference occurs between the shaft 1 and the shaft 2. This phase difference varies in proportion to the deforming amount of the spring 4, that is a torque applied to the load side.

This phase difference is detected by the electromagnetic pickups 9a, 9b which are opposed to the teeth 6a, 7a formed in the annular plates 6, 7.

When the shaft 1 rotates, the pickup 9a generates alternating voltage due to the change of magnetic resistance arising when the teeth 6a of the annular plate 6 pass the pickup 9a. The pickup 9b also generates alternating voltage.

The phase difference of the above two alternating voltages at the time when the switch 300 mounted on the transmission 200 is ON is detected by the data processing circuit 700. Thus, the phase difference under a no load condition is obtained.

The phase difference is apt to scatter due to the scattering of the mounting position of the annular plates 6, 7 or the pickups 9a, 9b.

When the transmission 200 is connected, the elastic members 4 deform in proportion to the applied torque, and the relative position of two annular plates 6, 7 also change in the circumferential direction thereof in proportion to the deformation volume of the eleastic members 4. At this time, the switch 300 is "OFF".

As a result, the phase difference between the alternating voltages of the pickups 9a, 9b, changes in response to the change of relative position of two annular plates 6, 7.

In this torque detector, by comparing this phase difference obtained when the transmission is connected, with that obtained when the transmission is neutral, the applied torque can be precisely detected.

Figure 5:
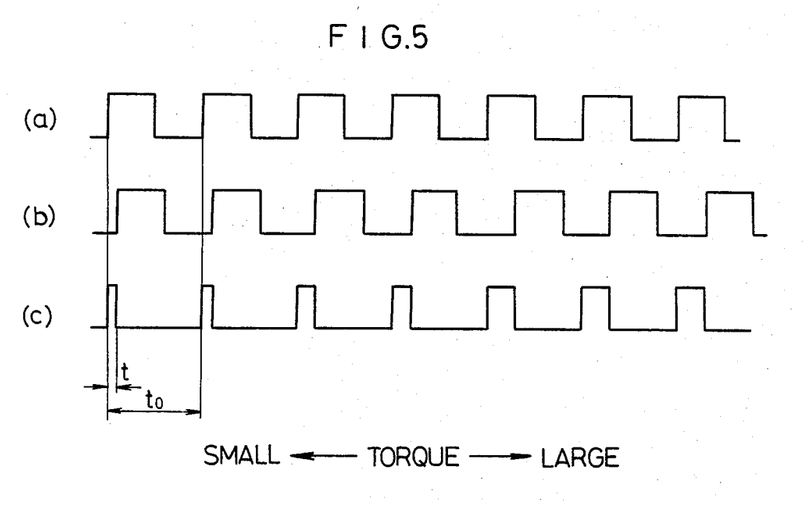
FIG. 5 is a waveform diagram of output signals.

FIG. 5(a) shows a pulse signal which is obtained by wave-shaping the alternating voltage signal generated by the pickup 9a and FIG. 5(b) shows a pulse signal which is obtained by wave-shaping the alternating voltage signal generated by the pickup 9b. When torque is applied, the phase of the alternating voltage signal from the pickup 9b delays from that of the alternating voltage signal from the pickup 9a in response to the applied torque. By detecting the phase difference between the pulse signal (a) and the pulse signal (b), a torque signal shown by (c) is obtained.

The period ($t_0$) of the pulse signal (c) is constant when the rotating speed of each of the shafts 1, 2 is constant. The time width (t) of the pulse signal (c) changes in proportion to the phase difference between the pulse signals (a), (b), namely, the applied torque.

Hereinafter, the data processing means 700 will be explained.

Figure 8:
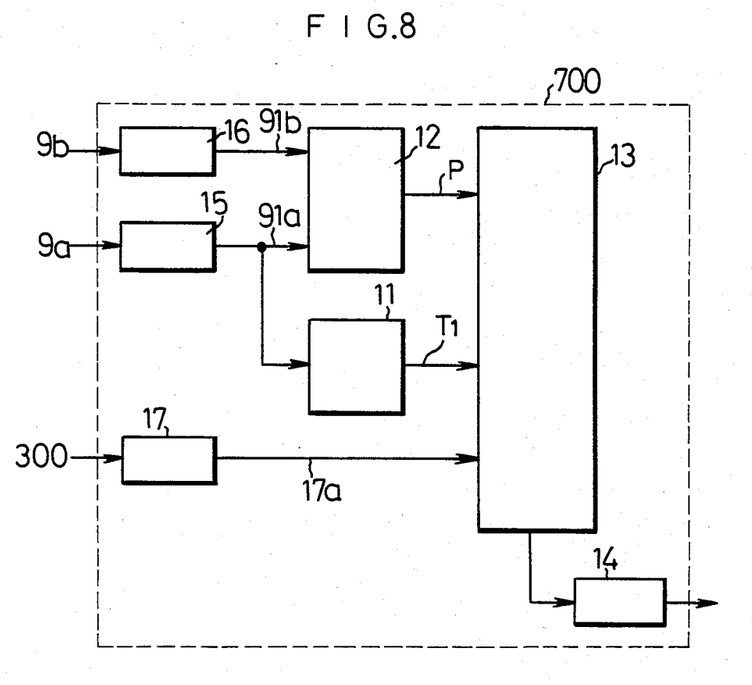
FIG. 8 is a block diagram of the angular phase difference detecting and the data processing means of the torque detector according to the present invention.

FIG. 8 is a block diagram of the angular phase difference detecting and the data processing means (700) of the present invention.

A rotating speed counting circuit 11 is electrically connected to the electromagnetic pickup 9a and a phase difference detecting circuit 12 is electrically connected to the electromagnetic pickups 9a and 9b.

The rotating speed counting circuit 11 and the phase difference detecting circuit 12 are electrically connected to a microcomputer 13 as the data processing circuit, respectively. And the data processing circuit 13 is electrically connected to an indicating circuit 14.

The reference numerals 15, 16, 17 designate wave-shaping circuits.

In operation, the output signal 91a detected by the pickup 9a and wave-shaped by the circuit 15 is fed to the rotating speed counting circuit 11 while the output signals 91a, 91b detected by the pickups 9a, 9b and wave-shaped by the circuits 15, 16 are fed to the phase difference detecting circuit 12.

The output signal of the switch 300 is wave-shaped by the circuit 17 and the output signal 17a is supplied to the data processing circuit 13.

The rotating speed counting circuit 11 feeds digital data $T_1$ which is proportional to the period of the output signal 91a and is inversely proportional to the rotating speed N, to the data processing circuit 13.

The phase difference detecting circuit 12 feeds digital data P which is proportional to the phase difference between the output signals 91a, 91b, to the data processing circuit 13.

Figure 9:
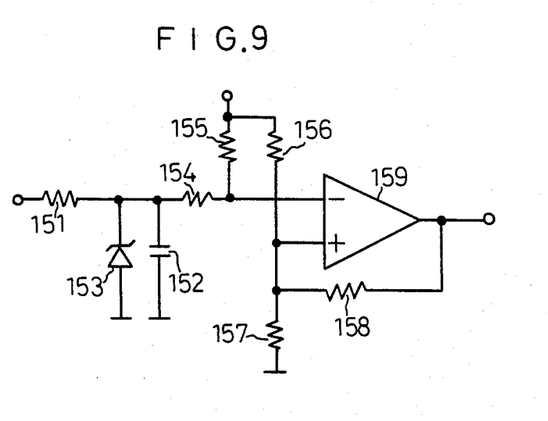
FIG. 9 is a circuit diagram of a wave-shaping circuit 15.

The data processing circuit 13 calculates the torque from the digital data $T_1$ and P and the signal 17a, and the obtained torque is indicated by the display circuit 14.

the wave-shaping circuit 15 comprises a low-pass filter composed of a resistor 151, a condensor 152 and a zenor diode 153, and a comparator circuit composed of resistors 154, 155, 156, 157, 158 and a comparator 159 as shown in FIG. 9.

To each of the inverting input terminal (−) and the non-inverting input terminal (+) of the comparator 159, bias voltage nearly equal to each other, is applied. The comparator 159 is provided with a positive feedback resistor 158 in order to make the rising and the falling of the output pulse signal sharp.

Figure 10:
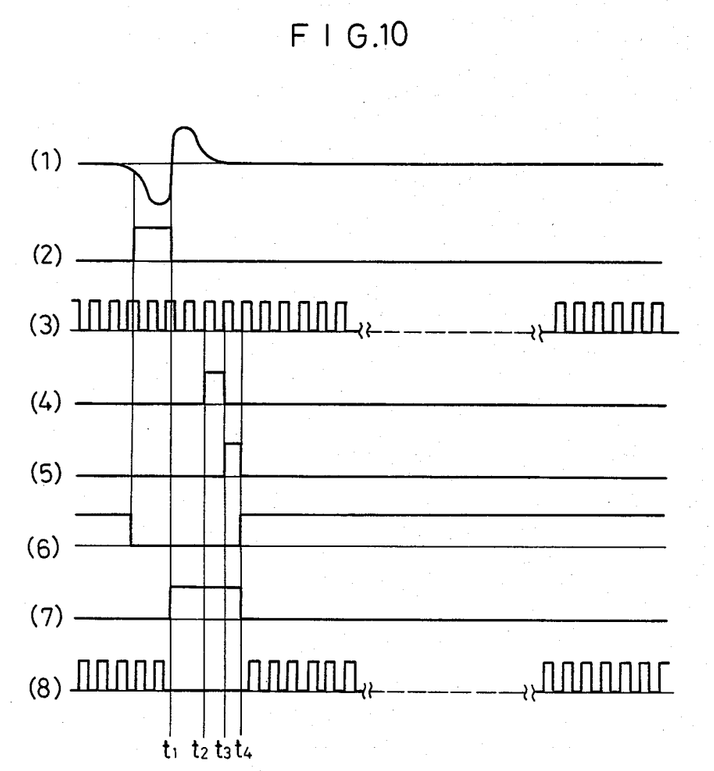
FIG. 10 is a waveform diagram showing the operation timing of a rotating speed counting circuit.

When the pulsating signal shown in FIG. 10(1) is fed from the pickup 9a to the pulse-shaping circuit 15, the comparator 159 generates the timing pulse signal having such a waveform as shown in FIG. 10(2).

The wave-shaping circuit 16 has the same construction as that of the circuit 15.

Figure 11:
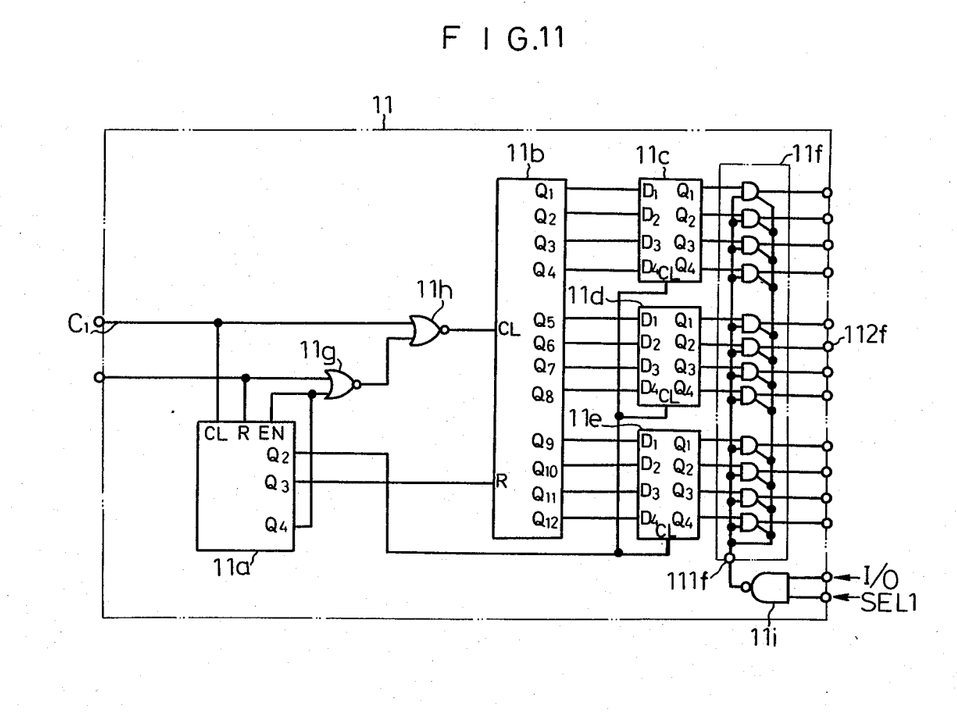
FIG. 11 is a circuit diagram of the rotating speed counting circuit.

FIG. 11 is a circuit diagram of the rotating speed counting circuit 11.

The reference numerals 11a, 11b designate counters, 11c, 11d, 11e designate shift registers and 11f designates a three-state buffer.

The counter 11a comprises a clock terminal CL, a reset terminal R, a counter enable terminal EN, and output terminals $Q_2$ to $Q_4$.

The output terminal $Q_4$ is connected to the counter enable terminal EN.

To the clock terminal CL, a clock pulse signal $C_1$ is applied and the counter 11a counts the clock pulse signal $C_1$. When the output signal from the output terminals $Q_4$ is "1" level, the "1" level signal is fed to the counter enable terminal EN to stop the counting operation of the counter 11a.

When the signal 91a shown in FIG. 10(2) is fed to the reset terminal R, the counter 11a is reset so that the output signal from the output terminal $Q_4$ is changed into "0" level as shown in FIG. 10(6).

When the signal 91a is changed into "0" level, the counter 11a starts the counting operation to generate the pulse signals shown in FIGS. 10(4), 10(5) from the output terminals $Q_2$, $Q_3$ in order.

When the output signal from the output terminal $Q_4$ is turned "1" level, the counter 11a stops the counting operation, again.

The counter 11b comprises a clock terminal CL, a reset terminal R and output terminals $Q_1$ to $Q_{12}$ which are electrically connected to input terminals $D_1$ to $D_4$ of each of shift registers 11c, 11d, 11e, respectively.

The output signal from the output terminal $Q_4$ of the counter 11a and the signal 91a are fed to a NOR gate 11g and the NOR gate 11g feeds a pulse signal shown in FIG. 10(7) to a NOR gate 11h.

The clock pulse signal $C_1$ shown in FIG. 10(3) is also fed to the NOR gate 11h. The NOR gate 11h feeds a pulse signal shown in FIG. 10(8) to the clock terminal CL of the counter 11b.

The output signal from the output terminal $Q_3$ of the counter 11a is fed to the reset terminal R of the counter 11b.

The output signal from the output terminal $Q_2$ of the counter 11a is fed to a clock terminal CL of each of the shift registers 11c, 11d, 11e.

The counter 11b stops the counting operation at the time $t_1$ when the signal 91a shown in FIG. 10(2) is changed into "0" level and the output signal from the NOR gate 11g shown in FIG. 10(7) is changed into "1" level.

Thereafter, the output signal from the output terminals $Q_1$ to $Q_{12}$ of the counter 11b are temporarily memorized by the shift registers 11c to 11e at the time $t_2$ when the output signal from the output terminal $Q_2$ of the counter 11a is changed into "1" level.

Next, at the time $t_3$ when the output signal from the output terminal $Q_3$ of the counter 11a is changed into "1" level, the counter 11b is reset and at the time $t_4$ when the output signal from the output terminal $Q_4$ of the counter 11a is changed into "1" level, the counter 11b starts the counting operation, again.

The counter 11b continuously feeds output signals (counted data) to the shift registers 11c, 11d, 11e so as to synchronize with the output signal 91a from the pickup 9a. Each of the shift registers 11c to 11e feeds digital data $T_1$ which is proportional to the pulse period of the output signal 91a, namely the reciprocal of rotating speed (1/N) of the shaft 1, from the output terminals $Q_1$ to $Q_4$ to a three-state buffer 11f.

The control terminal 111f of the three-state buffer 11f is connected to a NAND gate 11i.

To the NAND gate 11i, an input and output control signal (hereinafter will be called I/O signal) and a device select signal (SEL 1) are applied from a device control unit (DCU) of the microcomputer 13.

When the output signal of the NAND gate 11i is changed into "0" level, digital data $T_1$ which is proportional to the reciprocal of rotating speed is fed from the output terminals 112f to the microcomputer 13.

In this circuit, a well known quartz clock of about 524 KHz is used to feed a clock pulse signal.

Figure 12:
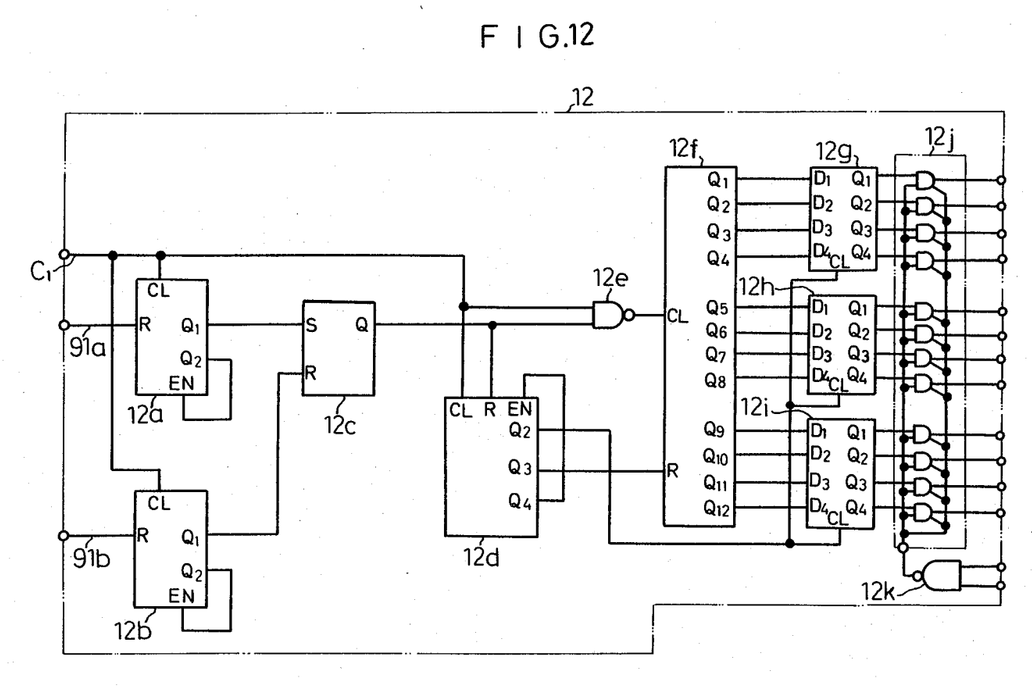
FIG. 12 is a circuit diagram of a phase difference detecting circuit.

FIG. 12 is a circuit diagram of the phase difference detecting circuit 12.

The reference numeral 12a, 12b, 12d, 12f designate counters, 12c designates a R-S flipflop, 12g, 12h, 12i designate shift registers and 12j designates a three-state buffer.

Figure 13:
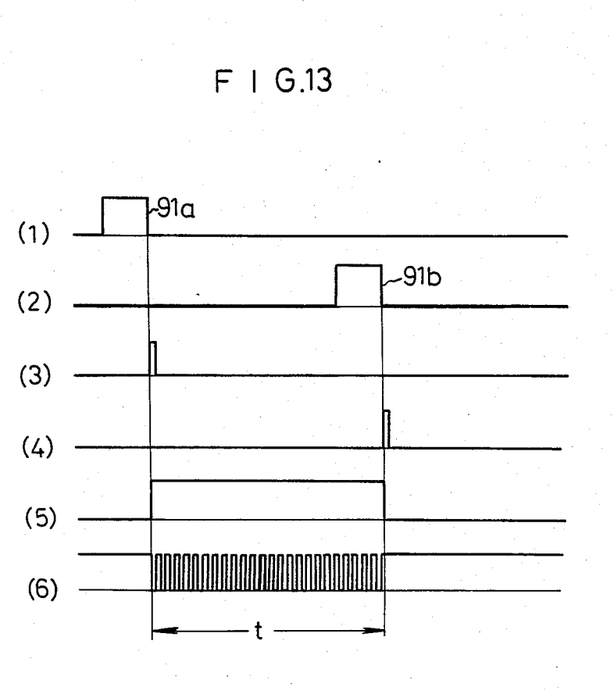
FIG. 13 is a waveform diagram showing the operation timing of the phase difference detecting circuit.

The signals 91a, 91b shown in FIG. 13(1), (2) are fed to the reset terminals R of the counters 12a, 12b, respectively. The counters 12a, 12b feed pulse signals shown in FIGS. 13(3), 13(4) from the output terminals $Q_1$ thereof to the S terminal and the R terminal of the R-S flipflop 12c, respectively.

The R-S flipflop 12c feeds a pulse signal shown in FIG. 13(5), of which "1" level is kept for a time t corresponding to the phase difference between the signals 91a, 91b, from the output terminal Q to the NAND gate 12e.

While the pulse signal from the R-S flipflop 12c is "1" level, the NAND gate opens to feed a clock pulse signal $C_1$ shown in FIG. 13(6) to the clock terminal CL of the counter 12f.

Next, the shift registers 12g to 12i, the three-state buffer 12j and a NAND gate 12k operate in the same manner as explained on the operation of the rotating speed counting circuit 11 to feed digital data P which is proportional to the time t corresponding to the phase difference between the output signals 91a, 91b, to the microcomputer 13.

The microcomputer 13 memorizes the digital data $T_1$ which is applied from the rotating speed counting circuit 11 and the digital data P which is applied from the phase difference detecting circuit 12 in an inside memory (RAM) every period determined by the program thereof.

Then, the microcomputer 13 calculates the torque from the memorized data.

The microcomputer 13 need not operate so as to synchronize with the rotating speed counting circuit 11 and the phase difference detecting circuit 12 since each of the circuits 11, 12 is provided with a latch circuit.

In order to improve the accuracy, the microcomputer 13 may be operated so as to receive input signals when the circuits 11, 12 receive input signals.

Figure 14:
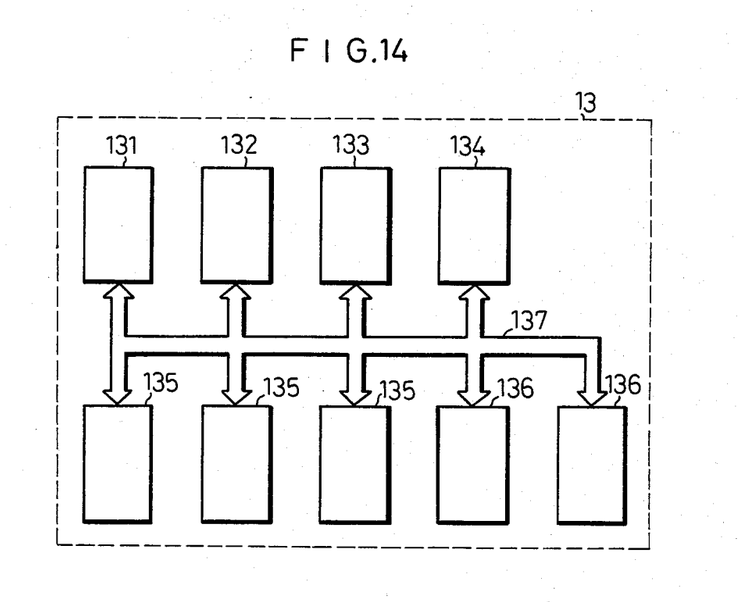
FIG. 14 is a block diagram of a microcomputer.

The construction of the microcomputer 13 is shown in FIG. 14. In FIG. 14, the reference numeral 131 designates a central processing unit, 132 designates an interruption latch unit, 133 designates a memory controlling unit, 134 designates an input and output signal controlling unit, 135 designates RAM and 136 designates ROM. They are connected to one another by means of a bus line 137.

According to this embodiment, a 7 segment LED is used as the display circuit 14. The 7 segment LED digitally displays the value of torque, which is calculated by the microcomputer 13.

Figure 15:
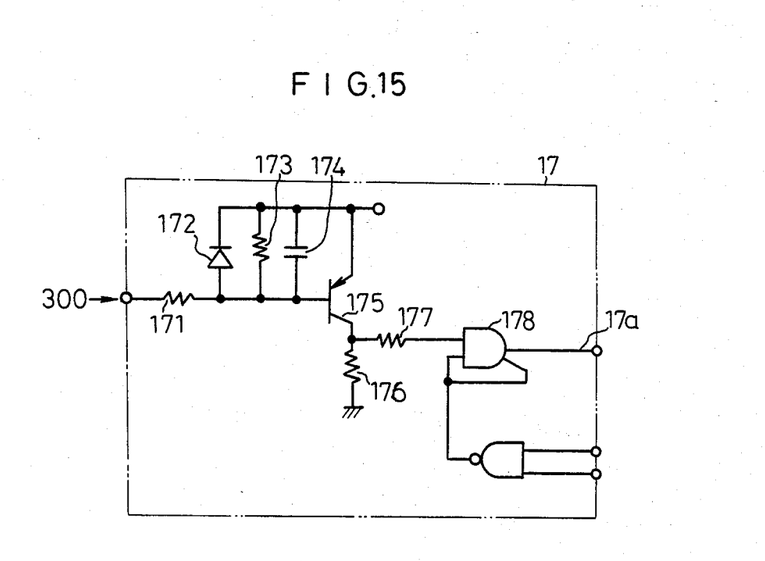
FIG. 15 is a circuit diagram of a wave-shaping circuit 17.

The wave-shaping circuit 17 is shown in FIG. 15. The wave-shaping circuit 17 shapes the switch signal generated by the neutral detecting means 300 in response to the neutral position of the transmission 200. Then, the wave-shaped signal 17a is fed to the microcomputer 13. The circuit 17 is composed of resistors 171, 173, 176, 177, a diode 172, a condensor 174 and a transistor 175. The wave-shaped signal 17a is fed to the microcomputer 13 through a three-state buffer 178.

Hereinafter, the data processing operation of the microcomputer 13 will be explained.

The pulse phase difference data $P_0$ detected by the phase difference detecting circuit 12 under the transmission-neutral condition, namely the no load condition and the pulse period data $T_0$ obtained by the rotating speed counting circuit 11 under the no load condition are previously memorized in RAM 135. Let the pulse phase difference detected under load condition be replaced by $P_1$ and the pulse period data under load condition be replaced by $T_1$, the angular phase difference $\theta_0$ under no load condition and the angular phase difference $\theta_L$ under load condition are expressed by the following equations (1), (2):

$$\theta_0 = (1/T_0) \cdot P_0 = N_0 \cdot P_0 \tag{1}$$

$$\theta_L = 1/T_1 \cdot P = N \cdot P \tag{2}$$

wherein $N_1$, $N_0$ are average rotating speed.

Next, accurate torque T is expressed by the following equation:

$$T = K(\theta_L - \theta_0)$$

wherein K is a constant.

As is apparent from the above equations, the accurate torque T is obtained by eliminating the angular phase difference under the no load condition, which arise due to errors in setting position or the like, from the angular phase difference under a torque condition.

The angular phase of each of the shafts 1, 2 can be detected electromagnetically or photoelectrically. In the electromagnetic or photoelectric detecting circuits, an oscillator or a switched semiconductor can also be used.

As described above, according to the present invention, by detecting an initial phase difference under a no load condition, the detected value of torque can be corrected. Therefore, errors in setting position, which arise when the torque detector is mounted on the automobile or the like can be compensated for. Furthermore, even when the initial phase difference changes over time, the detected value of torque can be corrected by the compensating change in the initial no load phase difference.

Figure 6:
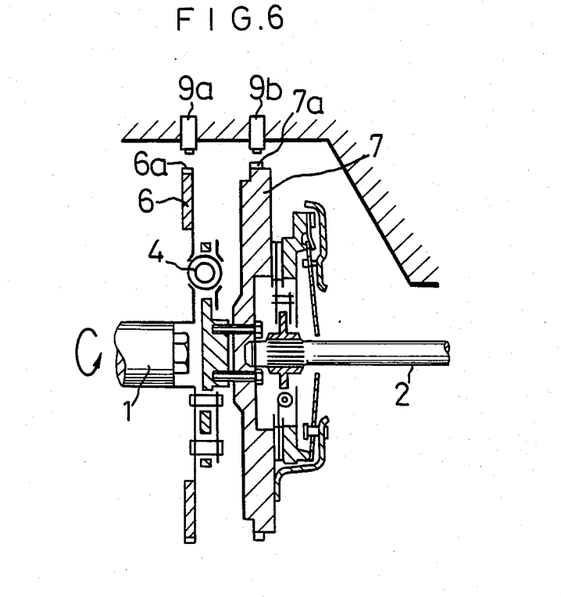
FIG. 6 is a longitudinal sectional view of another embodiment of the torque detector according to the present invention.
Figure 7:
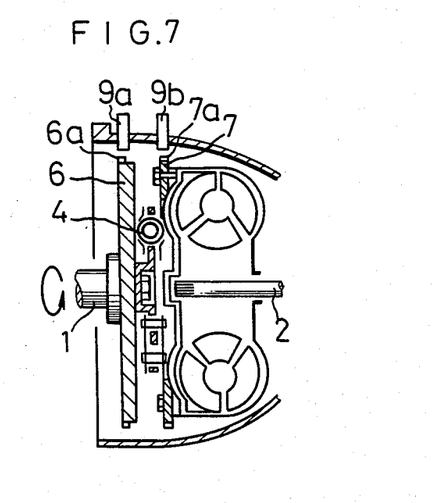
FIG. 7 is a longitudinal sectional view of still another embodiment of the torque detector according to the present invention.

In the above embodiment, the torque detector 400 is provided between the transmission 200 and the final gear 500. Instead, the torque detector 400 may be provided in a clutch portion between the engine 100 and the transmission 200 as shown in FIG. 6 or in a torque conveter as shown in FIG. 7.

In the above embodiment, the no load condition is detected by detecting the neutral position of the transmission. Instead the no load condition may be detected by detecting a predetermined manifold pressure, throttle opening, intake air volume, engine speed or driving shaft speed. In a manual transmission, the no load condition may be detected by means of a switch which is linked to the connection and the disconnection of the clutch.

What is claimed is:
1. A torque detector comprising:
   (1) a first rotating member adapted for connection to a driving shaft of an internal combustion engine so as to be rotated therewith;
   (2) a second rotating member adapted for connection to a load, which is provided so as to be coaxially opposed to said first rotating member;
   (3) at least one elastic member for connecting said first rotating member to said second rotating member; said at least one elastic member deforming in response to torque applied to said first rotating member and producing an angular phase difference between said rotating members due to the deformation thereof;
   (4) an angular phase difference detecting means for detecting angular phase difference between said first rotating member and said second rotating member;
   (5) a no load condition detecting means for detecting a no load condition of said engine; and
   (6) a data processing means for calculating accurate torque from the angular phase difference between said first rotating member and said second rotating member under a load condition and under the no load condition,
   said no load condition detecting means supplying a no load condition signal to said data processing means when said engine is under the no load condition.
2. A torque detector according to claim 1, wherein:
   each of said first and second rotating members has a flange formed in its opposed surface such that said flanges oppose each other;
   each of said opposed flanges being provided with at least one elastic member receiving portion, such that said at least one elastic member receiving por- tion, for each of said opposed flanges, are opposed to each other; and said at least one elastic member is received by said opposed elastic member receiving portions formed in said opposed flanges.

3. A torque detector according to claim 2, wherein, said at least one elastic member is made of a member selected from the group consisting of a rubber block and a coil spring.

4. A torque detector according to claim 2, wherein:

said angular phase difference detecting means comprises:

two annular plates which are coaxially disposed around said first rotating member and said second rotating member so as to rotate therewith, respectively;

each of said annular plates being provided with at least one tooth or notch in the outer periphery thereof at a predetermined angular position;

a pulse generating means for generating pulse signals upon detecting the passing of said tooth or notch, which is disposed so as to be opposed to the outer periphery of each of said annular plates;

a pulse phase difference detecting circuit for detecting pulse phase difference between said pulse signals;

a rotating speed counting circuit for counting rotating speed of said engine; and a processing circuit for calculating angular phase difference between said first rotating member and said second rotating member from the pulse phase difference and the rotating speed of said engine.

5. A torque detector according to claim 2, wherein:

said no load condition detecting means comprises a switching means which operates when said engine is disconnected from said load.

6. A torque detector according to claim 2, wherein:

said data processing means comprises a random access memory for memorizing the angular phase difference detected by said angular phase difference detecting means upon receiving said no load condition signal supplied from said no load condition detecting means; and a processing unit for calculating accurate torque from the angular phase difference detected under the load condition and under the no load condition which is memorized by said random access memory.

* * * * *